(12) United States Patent
Kwon

(10) Patent No.: US 11,148,594 B2
(45) Date of Patent: Oct. 19, 2021

(54) APPARATUS AND METHOD FOR AROUND VIEW MONITORING USING LIDAR

(71) Applicant: Mando Corporation, Pyeongtaek-si (KR)

(72) Inventor: Min Su Kwon, Anyang-si (KR)

(73) Assignee: Mando Corporation, Pyeongtaek-si (KR)

( * ) Notice: Subject to any disclaimer, the term of this patent is extended or adjusted under 35 U.S.C. 154(b) by 0 days.

(21) Appl. No.: 16/721,577

(22) Filed: Dec. 19, 2019

(65) Prior Publication Data

US 2020/0198538 A1     Jun. 25, 2020

(30) Foreign Application Priority Data

Dec. 20, 2018    (KR) .......................... 10-2018-0166057

(51) Int. Cl.
    *B60R 1/00*          (2006.01)
    *B60Q 9/00*         (2006.01)
                 (Continued)

(52) U.S. Cl.
    CPC ................ *B60R 1/00* (2013.01); *B60Q 9/008* (2013.01); *G06N 20/00* (2019.01); *G06T 13/00* (2013.01); *G08B 21/182* (2013.01); *G08G 1/165* (2013.01); *B60R 2300/301* (2013.01); *B60R 2300/607* (2013.01); *B60R 2300/802* (2013.01);
                 (Continued)

(58) Field of Classification Search
    CPC ................ B60R 1/00; B60R 2300/802; B60R 2300/301; B60R 2300/607; B60R 2300/806; B60R 2300/8093; B60R 2300/804; B60R 2300/10; B60Q 9/008; B60Q 9/00; G06N 3/08; G06N 20/00; G08B 21/182; G08B 21/18; G08G 1/165; G08G 1/167; G08G 1/16; G06T 13/00; G06T 2207/30261; G06T 2207/10028; G06T 7/20; G06T 2207/30252; G06T 2207/30244; G06K 9/00805; G06K 9/00791; G06K 9/00798; G06K 9/00825; G06K 9/6288; G06K 9/00268;
                 (Continued)

(56) References Cited

U.S. PATENT DOCUMENTS

| 9,383,753 | B1* | 7/2016 | Templeton | .............. G01S 17/42 |
| 2017/0008521 | A1* | 1/2017 | Braunstein | ............. G08G 1/167 |

(Continued)

*Primary Examiner* — Xilin Guo
(74) *Attorney, Agent, or Firm* — Morgan, Lewis & Bockius LLP

(57) ABSTRACT

According to the present disclosure, an apparatus and a method for around view monitoring using a LIDAR are provided. An around view monitoring apparatus according to the present disclosure includes: a traveling environment detector that detects traveling environment information for front, rear, left, and right detection areas of a vehicle using a LIDAR; a boundary extractor that extracts outlines of objects positioned in the detection areas and lanes from the detected traveling environment information; a video generator that generates images frames of the detection areas of the vehicle based on the outlines of the objects and the lanes that are extracted and generates a traveling environment video by combining the image frames; and a traveling environment outputter that outputs the generated traveling environment video.

11 Claims, 5 Drawing Sheets

(51) Int. Cl.
    *G06N 20/00*     (2019.01)
    *G08B 21/18*     (2006.01)
    *G08G 1/16*     (2006.01)
    *G06T 13/00*     (2011.01)

(52) U.S. Cl.
    CPC ... *B60R 2300/804* (2013.01); *B60R 2300/806* (2013.01); *B60R 2300/8093* (2013.01)

(58) Field of Classification Search
    CPC . G06K 9/00335; G01S 17/931; G01S 13/931; G01S 17/89
    See application file for complete search history.

(56) References Cited

U.S. PATENT DOCUMENTS

| | | | | |
|---|---|---|---|---|
| 2018/0284779 | A1* | 10/2018 | Nix | G08G 1/202 |
| 2018/0307915 | A1* | 10/2018 | Olson | G05D 1/0251 |
| 2019/0179320 | A1* | 6/2019 | Pacala | G01S 17/42 |
| 2019/0180467 | A1* | 6/2019 | Li | G01S 17/931 |
| 2019/0377965 | A1* | 12/2019 | Totolos, Jr. | G06T 1/20 |

* cited by examiner

<VICINITY MONITORING SITUATION>

APPARATUS AND METHOD FOR AROUND VIEW MONITORING USING LIDAR

CROSS-REFERENCE TO RELATED APPLICATION

This application claims priority from Korean Patent Application No. 10-2018-0166057, filed on Dec. 20, 2018, which is hereby incorporated by reference for all purposes as if fully set forth herein.

BACKGROUND OF THE INVENTION

Field of the Invention

These embodiments relate to an apparatus and method for around view monitoring using LIDARs. In more details, the embodiments relate to an apparatus and a method for installing LIDARs on front and rear sides and left and right sides of a vehicle and generating a video by detecting a traveling environment.

Description of Related Art

An around view monitoring (AVM) system represents a function for providing a 360° video of the vicinity of a vehicle for a driver. A two-dimensional AVM video providing apparatus captures images of the vicinity of a vehicle and provides a video in a top-view form by composing the images.

At this time, generally, the AVM system has cameras including wide-angle lenses such as fisheye lenses mounted on a front side, a rear side, a left side, and a right side of a vehicle, composes many vicinity videos including a front video, a rear video, a left video, and a right video of the vehicle acquired from these cameras, and outputting a resultant video on a screen as one around view video.

However, in the case of an around view video using cameras, radial distortion occurs according to refractive indexes of lenses, and there is a problem in that a driver cannot clearly recognize an accurate distance and a position from an around view video output to the driver in accordance with video distortion.

SUMMARY OF THE INVENTION

These embodiments revised from the background described above are to propose an apparatus and a method for around view monitoring using LIDARs.

In addition, these embodiments are to propose an apparatus and a method for around view monitoring capable of generating a traveling environment video having high reliability based on traveling environment information of a vehicle detected through LIDARs.

In order to achieve the objects described above, an around view monitoring apparatus according to this embodiment may include: a traveling environment detector that detects traveling environment information for front, rear, left, and right detection areas of a vehicle using a LIDAR; a boundary extractor that extracts outlines of objects positioned in the detection areas and lanes from the detected traveling environment information; a video generator that generates images frames of the detection areas of the vehicle based on the outlines of the objects and the lanes that are extracted and generates a traveling environment video by combining the image frames; and a traveling environment outputter that outputs the generated traveling environment video.

In order to achieve the objects described above, an around view monitoring method according to this embodiment may include: a traveling environment detecting step of detecting traveling environment information for front, rear, left, and right detection areas of a vehicle using a LIDAR; a boundary extracting step of extracting outlines of objects positioned in the detection areas and lanes from the detected traveling environment information; a video generating step of generating images frames of the detection areas of the vehicle based on the objects and the lanes that are extracted and generating a traveling environment video by combining the image frames; and a traveling environment outputting step of outputting the generated traveling environment video.

These embodiments provide a traveling environment video of a vehicle that is not distorted for a driver, and accordingly, there is an effect of improving the convenience of traveling.

In addition, since LIDARs having high accuracy in extracting objects and lanes are used in these embodiments, an around view having high reliability can be provided for a driver.

Furthermore, these embodiments can replace sensor devices of a conventional front cross alert system, a rear cross alert system, and a parking assist system, and accordingly, there is an effect of reducing the cost.

DETAILED DESCRIPTION OF THE INVENTION

Figure 1:
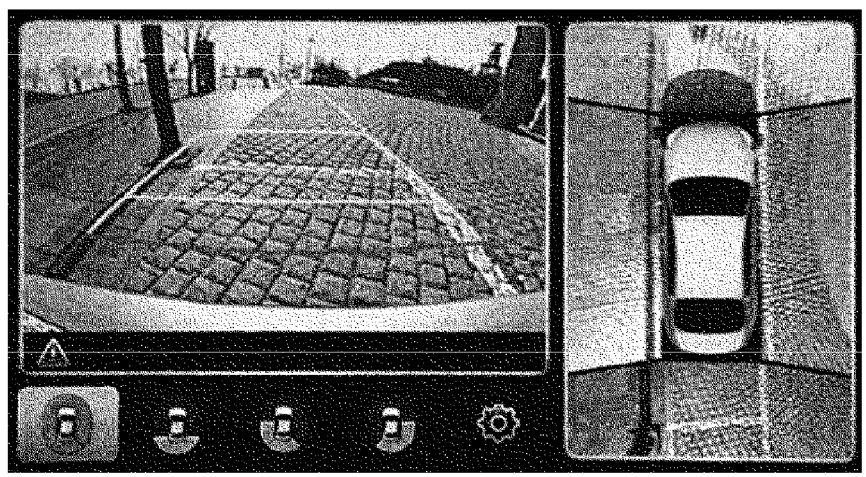
FIG. 1 is one example of an around view video of an around view monitoring system using conventional wide-angle cameras.

The present disclosure discloses a control apparatus and a method for a parking assist system.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompass all the meanings of the term "can".

Hereinafter, the present disclosure will be described in more detail with reference to the attached drawings.

FIG. 1 is one example of an around view video of an around view monitoring system using conventional wide-angle cameras.

As illustrated in the drawing, a conventional around view monitoring (AVM) system collects traveling environment information from a detection apparatus and provides a two-dimensional 360° video of the vicinity of a vehicle for a driver, whereby a collision accident can be prevented.

At this time, generally, an around view monitoring system has cameras including wide-angle lenses such as such as fisheye lenses mounted on a front side, a rear side, a left side, and a right side of a vehicle, combines videos of the front side, the rear side, the left side, and the right side of the vehicle acquired from these cameras, and outputs a resultant video on a screen as one around view video.

Here, the around view monitoring system edits multiple vicinity videos to fit into respective video assignment areas and generates an around view video as illustrated in FIG. 1 by joining video joining areas in which multiple edited vicinity videos are joined through a blending technique.

However, as illustrated in FIG. 1, since the video joining areas are discontinuously displayed when an around view video is generated, in a case in which there is an obstacle in a video joining area, there is a problem in that a driver cannot accurately recognize the obstacle that is discontinuously displayed and may be confused.

In addition, generally, an around view monitoring system uses wide-angle cameras capable of securing wide fields of vision. However, in wide-angle cameras, a recognizable radius may be small more or less, and radial distortion inevitably occurs due to a refractive index of a convex lens, and accordingly, not only visual distortion of a sense of distance occurs in an around view video output to a driver, but serious error may be caused in image recognition of an image processing apparatus.

In this way, since video joining areas are discontinuously displayed when an around view video is generated, the around view video in which a sense of distance is visually distorted is provided for a driver, and there is a problem in that an obstacle cannot be accurately recognized.

Figure 2:
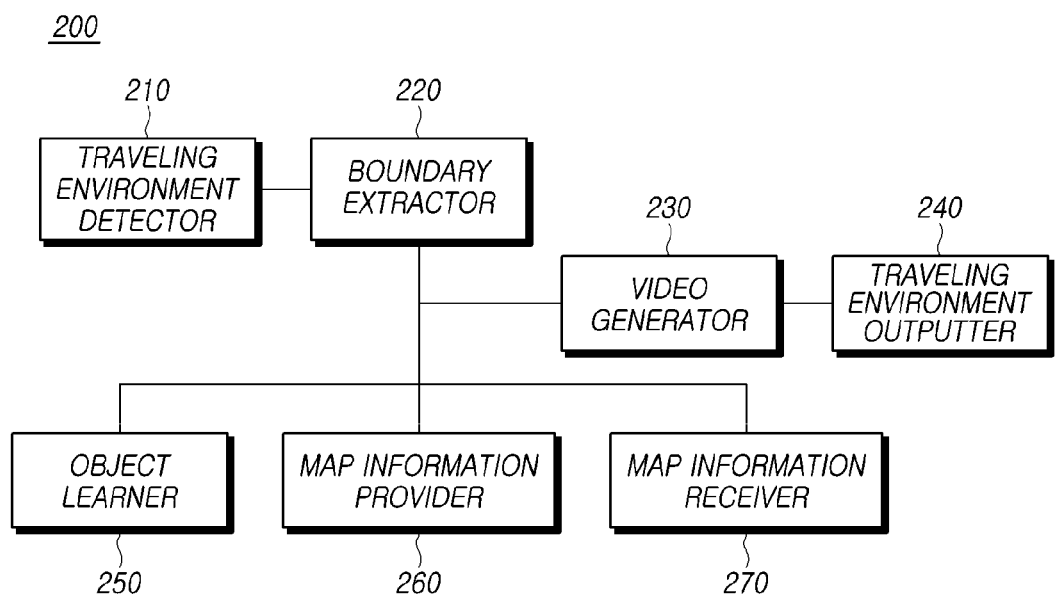
FIG. 2 is a block configuration diagram of an around view monitoring apparatus according to one embodiment of the present disclosure.

FIG. 2 is a block configuration diagram of an around view monitoring apparatus 200 according to one embodiment of the present disclosure.

Referring to FIG. 2, the around view monitoring apparatus 200 according to the present disclosure may include: a traveling environment detector 210 that detects traveling environment information for front, rear, left, and right detection areas of a vehicle using LIDARs; a boundary extractor 220 that extracts outlines of objects positioned in the detection areas described above and lanes from the detected traveling environment information described above; a video generator 230 that generates images frames of the detection areas of the vehicle based on the objects and the lanes that have been extracted and generates a traveling environment video by combining the image frames; and a traveling environment outputter 240 that outputs the generated traveling environment video described above.

In addition, the around view monitoring apparatus 200 may further include an object learner 250 that learns the outlines of the objects, classifies types of the objects, and stores images according to the types. For example, the around view monitoring apparatus 200 may perform classification of each object extracted from vicinity environment information using a learning algorithm set in advance. Here, objects may be classified in accordance with the types of objects. As one example, objects may be classified in accordance with object types such as a vehicle, an autocycle, a person, and the like. As another example, objects may be classified in accordance with sizes of the objects. Other than those, a method for classifying objects may be variously set using a learning algorithm set in advance.

In addition, the around view monitoring apparatus 200 may further include a map information provider 260 that checks a position of the vehicle by receiving position information and provides map information corresponding to the position of the vehicle out of map information stored in advance. The position information may be received by various means such as a GPS sensor configured inside the vehicle, a position sensor included in a navigation system of the vehicle, and the like, and the means are not limiting. For example, more accurate position information may be received through a mobile terminal of the driver. However, in such a case, it is checked whether the driver is present inside the vehicle, and it is determined whether corresponding position information can be used as the position information of the vehicle.

In addition, the around view monitoring apparatus 200 may further include a map information receiver 270 that communicates with a communicatable target and receives map information corresponding to the position of the vehicle from the communicatable target. For example, accurate map information corresponding to the position of the vehicle may be received through V2X communication using an infrastructure apparatus. For example, accurate map information may be received from a mobile terminal of the driver. Through this, an accurate map for all the positions does need to be stored inside the vehicle, and accordingly, changes in the map can be reflected more quickly and accurately.

More specifically, a LIDAR configuring the traveling environment detector 210 is an abbreviation of "Light Detection And Ranging" and is an active-type exploration apparatus that uses a principle similar to that of a radar and acquires wanted information without having a direct contact with an object through a laser. Generally, the LIDAR is an apparatus that is mounted in an airplane, in which a global positioning system (GPS) and an inertial navigation system (INS) are installed, and can perform not only acquisition of accurate three-dimensional geographical information (a digital elevation model (DEM)) but also measurement of coast lines and submarine topography having a shallow depth of water. In addition, the LIDAR can perform more accurate extraction of objects and lanes than a camera apparatus and have a wide range of detection areas.

At this time, a plurality of LIDARs are mounted on the front side, the rear side, the left side, and the right side of the vehicle, and the traveling environment detector 210 may detect or receive traveling environment information of the detection areas recognized by the LIDARs. For example, the traveling environment information may be received from a plurality of LIDARs for which detection ranges are set for detecting detection areas. For this, the vehicle may include two or more LIDARs, and each of the LIDARs collects traveling environment information for a set detection range. However, this is an example, and one LIDAR may be set as a detection area for all the directions of the vehicle and detect traveling environment information. In such a case, the LIDAR is positioned on a rooftop of the vehicle and detects traveling environment information for all the directions of the vehicle through a rotation operation.

Then, the boundary extractor 220 may extract the outlines of objects and the lanes using a general video processing technology from the traveling environment information detected by the traveling environment detector 210.

For example, the boundary extractor 220 may remove unnecessary edge components and leave only optimal edge components by extracting edge components from the traveling environment information detected by the LIDAR and repeatedly performing a Hough transform. Then, by extracting linear elements while decreasing the number of sets of outskirt points of objects and lanes using the remaining edge components, outlines of objects and the lanes having complex forms can be extracted.

Then, the object learner 250 can determine type of the objects by receiving the outlines of the objects extracted by the boundary extractor 220 and performing learning and classify the objects according to types.

In other words, the object learner 250 may learn outlines of the objects, determine whether an object positioned in the vicinity of the vehicle is a vehicle, a two-wheel vehicle, a bicycle, or a person, and match a predetermined image output through the traveling environment outputter 240 to the object in accordance with the type of the object.

For example, when the object is determined as and classified into a bicycle as a result of causing the object learner 250 to learn outlines of specific objects, an image of a bicycle stored in the object learner 250 may be transmitted to the video generator 230 with being matched to the position of the specific object and a space.

In addition, the object learner 250 may learn also the lanes extracted by the boundary extractor 220, determine kinds of road surface marks of the lanes and the types of lane through learning features of the lanes, and match a predetermined image output through the traveling environment outputter 240 in accordance with the type of the lane.

Accordingly, the object learner 250 may easily generate the traveling environment video without visual distortion by matching an image corresponding to the outlines of the object and the lane and transmitting the image to the video generator 230.

Alternatively, as described above, the object learner 250 may classify objects in accordance with sizes as the criteria.

Then, the map information provider 260 may check the current position of the vehicle by receiving GPS position information and provide map information corresponding to the vehicle position to the video generator 230.

In other words, in a case in which the map information provider 260 is included, the video generator 230 may receive map information from the map information provider 260, specifically determine an object by matching or overlapping the outline of the object and the lane with the map information, and generate a more accurate image frame by accurately identifying the position of the object and the position of the lane.

In order to perform this, the map information provider 260 may include a navigation, a memory in which map information is stored, an ECU, and the like. However, the configuration is not limited thereto.

Then, the map information receiver 270 may communicate with a communicatable target and receive map information from the communicatable target. When the map information is received, the map information receiver 270 may transmit the received map information to the video generator 230.

In other words, in a case in which the map information receiver 270 is included, the video generator 230 may receive map information from the map information receiver 270, specifically determine an object by matching or overlapping the outline of the object and the lane with the map information, and generate a more accurate image frame by accurately identifying the position of the object and the position of the lane.

Here, as communicatable targets, for example, there are a set-top box, an infrastructure, a signal light, a network sharing device, a mobile terminal of the driver, and the like.

Here, the received map information may be map information from the communicatable target that corresponds to a place at which a target is disposed.

For this, the map information receiver 270 may use a vehicle-to-vehicle (V2V) communication technology and use a vehicle-to-Everything (V2X) communication technology with a vehicle including a vehicle-to-infrastructure (V2I) communication technology.

The V2X that is vehicle-to-vehicle communication used in the present disclosure represents a vehicle's exchanging information with things such as another vehicle, a mobile device, a road, and the like through a wired or wireless network or a technology thereof and includes concepts of vehicle-to-vehicle (V2V) communication, vehicle-to-infrastructure (V2I) communication, vehicle-to-nomadic device (V2N; vehicle-to-mobile device) communication, vehicle-to-pedestrian (V2P) communication, and the like, and the V2N communication that is vehicle-to-mobile device communication may be mainly used in the present disclosure.

The V2X is based on dedicated short-range communications (DSRC) and may use a wireless access in vehicular environment (WAVE) that has been progressed recently by U.S. IEEE or an IEEE 802.11p communication technology using 5.9 GHz band but is not limited thereto and should be understood to include all the vehicle-to-vehicle communications that are currently available or may be developed in the future.

Then, in order to generate the traveling environment video, the video generator 230 can generate the image frame of each of the detection areas by receiving data acquired by extracting an outline of the object and the lane from the boundary extractor 220 and receiving image information corresponding to the outline of the object and the lane from the object learner 250.

At this time, the video generator 230 combines the image frames of the detection areas into one traveling environment video. Since the traveling environment video is not an actual traveling environment video captured by the camera but a video acquired by reconfiguring the traveling environment information recognized by the LIDARs, the image frames can be combined such that each area in which the image frames are joined is continuously expressed.

In other words, the video generator 230 can continuously express the object or the lane positioned in areas in which the image frames are joined and reduce a distortion phenomenon for a sense of distance of the traveling environment video.

In addition, the video generator 230 may generate time-series image frames for the detection areas based on the traveling environment information received in real time through the traveling environment detector 210 and generate the traveling environment video as a two-dimensional or three-dimensional animation using the time-series image frames.

In other words, the video generator 230 can generate the traveling environment video as a dynamic animation video by continuously outputting the time-series image frames acquired by arranging the image frames in a time series in order of time.

In addition, the video generator 230 may perform mapping of the time-series image frames that are two-dimensionally generated into a virtual projected plane in a three-dimensional space. At this time, the virtual projected plane may be in the form of a cylinder, a cone, a half sphere, a bowl in which the diameter of an upper part is larger than the diameter of a lower part, or the like but is not limited thereto. An animation for the three-dimensional traveling environment video can be generated by performing rendering of a top view based on the mapped time-series image frames.

For example, an animation may be images corresponding to a type of objects that are learned and classified through a learning algorithm for each object. In other words, an animation represents not images of an actual object but images that correspond to a corresponding object and are stored in advance. Through this, a distortion phenomenon of an object on an output screen can be prevented.

On the other hand, as described above, in a case in which objects are classified based on types of the objects using a learning algorithm, images that are mapped into a corresponding type and stored may be displayed as an animation. Of course, in a case in which objects are classified based on sizes of the objects in accordance with a setting of the learning algorithm, images having a size corresponding to the classification may be displayed as an animation. Similarly, in a case in which objects are classified based on both the types and sizes of the objects using a learning algorithm, images of a type and a size mapped into a classified type may be used for an animation.

In addition, the video generator 230 may determine whether or not a separation distance between the object and the vehicle on the image frame is shorter than a threshold distance and generate a warning signal. By assigning the warning signal to the object separated within the threshold distance together with generating the traveling environment video, it can be transmitted to the traveling environment outputter 240.

Then, the traveling environment outputter 240 may output an alarm that warns a collision based on the warning signal for the object separated from the vehicle within the threshold distance together with outputting the traveling environment video.

At this time, the traveling environment outputter 240 may be realized by at least one or more of an audio, a vibrator, and a video included in the vehicle and may be an additional output terminal that can output the warning signal and provides corresponding information for an external device that is connected thereto in a wired or wireless manner.

For example, the traveling environment outputter 240 may be a speaker that outputs a warning alarm for warning the risk of an accident at the time of changing lanes, a warning lamp that is installed at an instrument panel of the vehicle and is turned on/off or blinking, a head-up display device that displays a warning video or characters on a front glass of the vehicle, a display device in which a function of a navigation displaying the host vehicle and another vehicle on the screen and the like are embedded, a haptic member that is installed in a steering wheel, a seat, or an acceleration pedal of the vehicle and generates vibrations, or the like.

In addition, the traveling environment outputter 240 may generate and output a traveling control signal corresponding to the warning signal for controlling the traveling of the vehicle, and the traveling control signal may be transmitted to a traveling assist system including a blind spot detecting (BSD) system, a lane departure warning system (LDWS) and a lane keeping assist system (LKAS), smart cruise control (SCC), a smart parking assist system (SPAS), and the like.

For example, in a case in which an object such as an obstacle is detected within the threshold distance in the rear cross detection area of the vehicle, a collision warning sound may be generated for the driver of the vehicle through the traveling environment outputter 240, or the traveling control signal corresponding to the warning signal may be transmitted to the traveling assist system. Then, the traveling assist system may control the steering wheel, the transmission gear, and a braking device of the vehicle such that the vehicle avoids the obstacle.

Accordingly, since the around view monitoring apparatus according to the present disclosure described above provides an undistorted traveling environment video of the vehicle for the driver, there is an effect of improving the convenience of traveling. In addition, sensor devices of a front cross alert system, a rear cross alert system, and a parking assist system of a conventional case can be replaced, and accordingly, there is an effect of reducing the cost.

Figure 3:
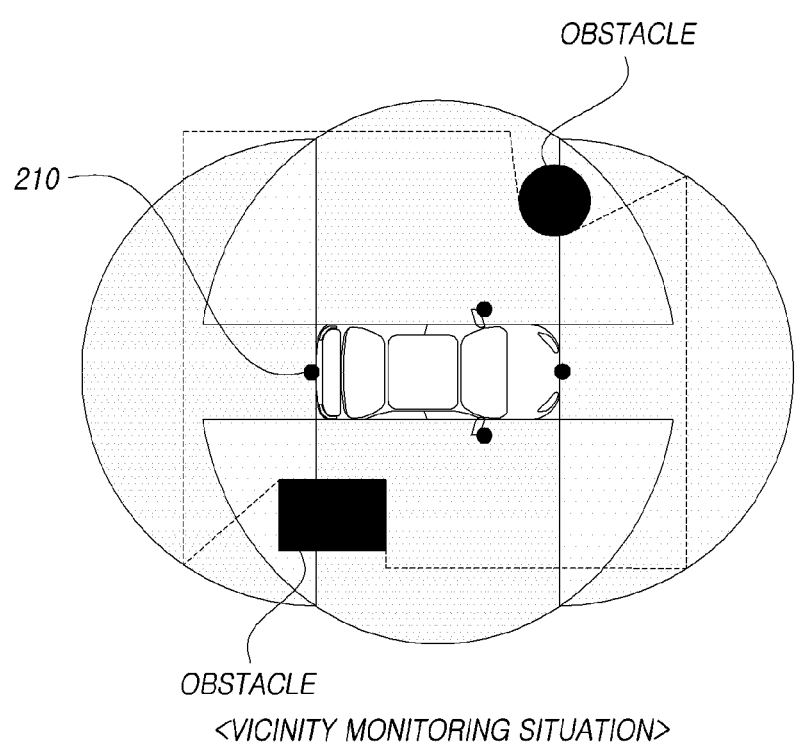
FIG. 3 is a simplified diagram illustrating a detection area of an around view monitoring apparatus according to one embodiment of the present disclosure.

FIG. 3 is a simplified diagram illustrating a detection area of an around view monitoring apparatus according to one embodiment of the present disclosure.

Referring to FIG. 3, four LIDARs are mounted on the front side, the rear side, the left side, and the right side of the vehicle, and the LIDARs configuring the traveling environment detector 210 may receive traveling environment information of recognized detection areas.

At this time, the detection areas are configured as four detection areas by four LIDARs, and four image frames may be generated for the four detection areas by the video generator 230.

Then, the video generator 230 combines four image frames into one traveling environment video, and the traveling environment video may be output through the traveling environment outputter 240 with images of a dotted-line area and obstacles displayed in FIG. 3 reconfigured.

Figure 4:
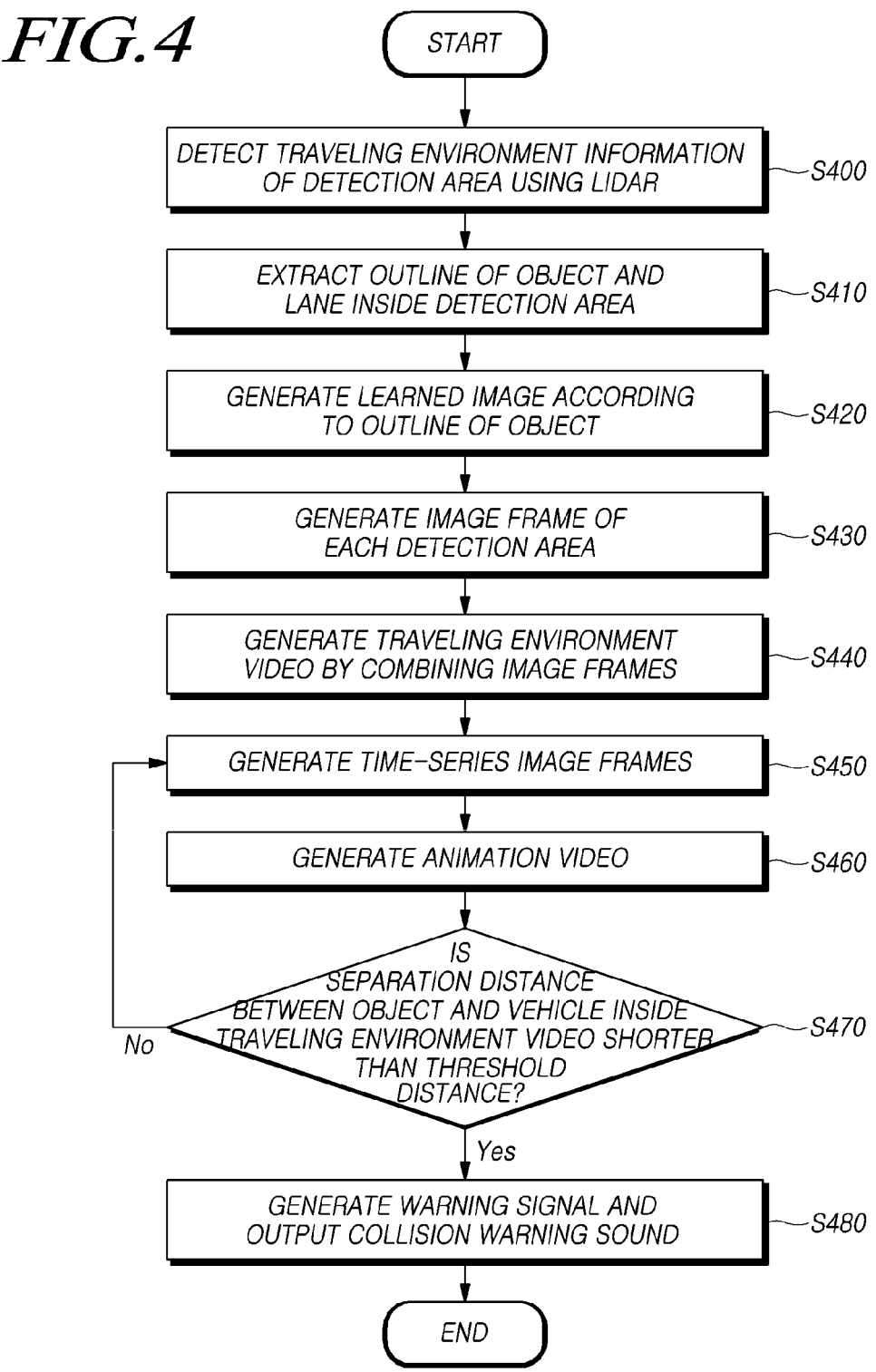
FIG. 4 is a flowchart illustrating an around view monitoring method according to one embodiment of the present disclosure.

FIG. 4 is a flowchart illustrating an around view monitoring method according to one embodiment of the present disclosure.

The around view monitoring method according to the present disclosure may include: a traveling environment detecting step of detecting traveling environment information for front, rear, left and right detection areas of a vehicle using LIDARs; a boundary extracting step of extracting outlines of objects positioned in the detection areas and lanes from the detected traveling environment information; a video generating step of generating image frames of the detection areas of the vehicle based on the objects and the lanes that are extracted and generating a traveling environment video by combining the image frames; a traveling environment output step of outputting the generated traveling environment video; and an object learning step of learning the outlines of the objects, classifying types of the objects, and storing images according to the types of the objects.

Referring to FIG. 4, in the traveling environment detecting step, the traveling environment information of the detection areas is detected by the LIDARs (S400). At this time, a plurality of LIDARs may be mounted on the front side, the rear side, the left side, and the right side of the vehicle.

In the boundary extracting step, outlines of objects positioned in the detection areas and lanes are extracted from environment information (S410).

For example, by extracting edge components from the traveling environment information detected by the LIDARs and repeatedly performing a Hough transform, unnecessary edge components are removed, and only optimal edge components can be left. Then, by extracting linear elements while decreasing the number of sets of outskirt points of objects and lanes using the remaining edge components, outlines of objects and the lanes having complex forms can be extracted.

Then, in the object learning step, the extracted outlines of the objects are caused to learned, types of the objects are classified, and images according to the types of the objects are generated (S420).

In other words, the features of the outlines of the objects are learned, and it is determined whether or not each object positioned in the vicinity of the vehicle is a vehicle, a two-wheel vehicle, a bicycle, or a person, and a predetermined image can be matched in accordance with the type of the object.

Then, in the video generating step, the image is applied to the object, an image frame of each of the detection areas is generated by receiving the extracted lanes (S430), and one traveling environment video is generated by combining the image frames (S440).

In addition, a time-series image frame for the detection area is generated based on the traveling environment information received in real time (S450), and the traveling environment video is generated as a two-dimensional or three-dimensional animation using the time-series image frames (S460).

At time, an animation for the three-dimensional traveling environment video can be generated by performing rendering of a top view based on the time-series image frames that are two-dimensionally generated.

At the same time, it is determined whether or not a separation distance between the object and the vehicle is shorter than a threshold distance inside the traveling environment video (S470).

At this time, when the separation distance between the object and the vehicle is shorter than the threshold distance, the warning signal is generated together with the traveling environment video, whereby the traveling environment video and the collision warning sound are simultaneously output in the traveling environment output step (S480).

Figure 5:
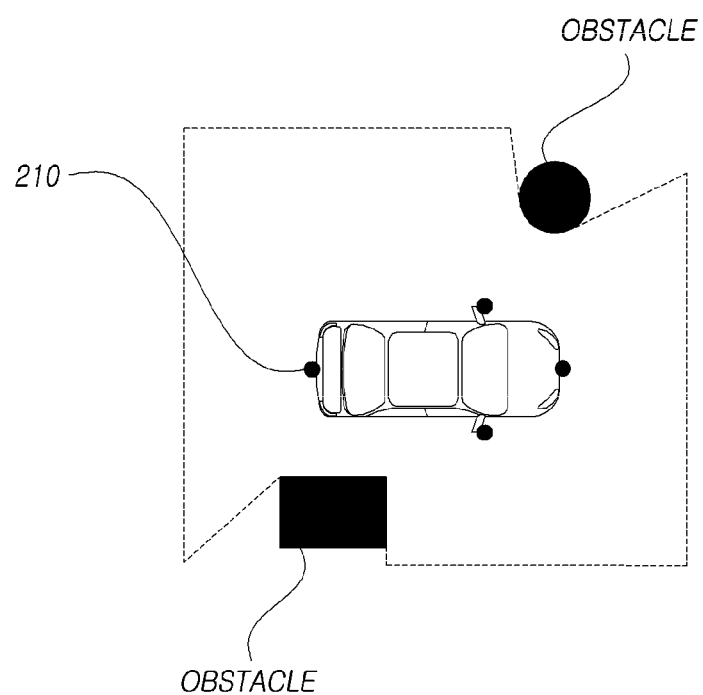
FIG. 5 is a diagram illustrating an example of an animation output screen of an around view monitoring apparatus according to one embodiment of the present disclosure.

FIG. 5 is a diagram illustrating an example of an animation output screen of an around view monitoring apparatus according to one embodiment of the present disclosure.

Referring to FIG. 5, on an around view monitoring screen to which this embodiment is applied, obstacles present in the vicinity of the vehicle are detected through traveling environment information received through the LIDARs of the vehicle, and the obstacles are classified based on the form, the size, the type, and the like and then are converted into corresponding images.

Accordingly, as illustrated in FIG. 5, video distortion occurring in accordance with camera sensors in a case in which image frames of the detection areas are combined is prevented, and a simplified screen can be provided in the form of an animation. As is necessary, the obstacles may be replaced with images stored in association with object classifications in advance, and, in such a case, a screen having a more sense of reality can be provided.

As described above, the apparatus and the method for around view monitoring according to the present disclosure provide an undistorted traveling environment video of a vehicle, and accordingly, there is an effect of improving the convenience of traveling. In addition, since LIDARs having high accuracy are used for extracting objects and lanes, an around view having high reliability can be provided for a driver.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

REFERENCE SIGNS LIST

200: around view monitoring apparatus
210: traveling environment detector
220: boundary extractor
230: video generator
240: traveling environment outputter
250: object learner

What is claimed is:

1. An around view monitoring apparatus comprising:
a traveling environment detector that detects traveling environment information for front, rear, left, and right detection areas of a vehicle using a LIDAR;

a boundary extractor that extracts outlines of objects positioned in the detection areas and lanes from the detected traveling environment information;

a video generator that generates image frames of the detection areas of the vehicle based on the outlines of the objects and the lanes that are extracted and generates a traveling environment video by combining the image frames;

a traveling environment outputter that outputs the generated traveling environment video; and an object learner that learns the outlines of the objects through a learning algorithm set in advance, classifies types of the objects based on the outlines, and matches predetermined images output through the traveling environment detector to the objects in accordance with the types of the objects, wherein the video generator generates time-series image frames for the detection areas based on the traveling environment information received at regular time intervals, and generates the traveling environment video as a two-dimensional or three-dimensional animation using the time-series image frames.

2. The around view monitoring apparatus according to claim 1, wherein the object learner stores images according to the types of the objects.

3. The around view monitoring apparatus according to claim 1, wherein the traveling environment information is received from a plurality of the LIDARs of which detection ranges are set such that the LIDARs detect the detection areas.

4. The around view monitoring apparatus according to claim 1, further comprising a map information provider that checks a position of the vehicle by receiving position information and provides map information corresponding to the position of the vehicle out of map information stored in advance.

5. The around view monitoring apparatus according to claim 1, further comprising a map information receiver that communicates with a communicatable target and receives map information corresponding to a position of the vehicle from the communicatable target.

6. The around view monitoring apparatus according to claim 1, wherein the animation is an image according to a type of the object that is learned and classified through a learning algorithm for each object.

7. The around view monitoring apparatus according to claim 1, wherein the video generator determines whether or not a separation distance between the object and the vehicle on the image frame is shorter than a threshold distance and generates a warning signal in a case in which the separation distance between the object and the vehicle is shorter than the threshold distance.

8. The around view monitoring apparatus according to claim 7, wherein the traveling environment outputter outputs an alarm for warning a collision based on the warning signal for the object separated from the vehicle within the threshold distance.

9. An around view monitoring method comprising:
a traveling environment detecting step of detecting traveling environment information for front, rear, left, and right detection areas of a vehicle using a LIDAR;

a boundary extracting step of extracting outlines of objects positioned in the detection areas and lanes from the detected traveling environment information;

a video generating step of generating image frames of the detection areas of the vehicle based on the objects and the lanes that are extracted and generating a traveling environment video by combining the image frames;

a traveling environment outputting step of outputting the generated traveling environment video; and an object learning step of learning the outlines of the objects through a learning algorithm set in advance, classifying types of the objects, and matching predetermined images output through the traveling environment detector to the objects in accordance with the types of the objects, wherein the video generating step comprises:
generating time-series image frames for the detection areas based on the traveling environment information received at regular time intervals;

generating the traveling environment video as a two-dimensional animation or three-dimensional animation based on the time-series image frames.

10. The around view monitoring method according to claim 9, wherein the object learning step further comprises storing images according to the types of the objects.

11. The around view monitoring method according to claim 9, wherein the animation is an image according to a type of the object that is learned and classified through a learning algorithm for each object.

* * * * *